United States Patent
McKay et al.

(10) Patent No.: US 7,699,940 B2
(45) Date of Patent: Apr. 20, 2010

(54) FLUSHING SOLUTIONS FOR COATINGS REMOVAL

(75) Inventors: Jennifer McKay, Wyandotte, MI (US); Charles K. Cox, Macomb Township, MI (US); Neil R. Wilson, Gulph Mills, PA (US)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 429 days.

(21) Appl. No.: 11/654,867

(22) Filed: Jan. 18, 2007

(65) Prior Publication Data

US 2007/0117733 A1 May 24, 2007

Related U.S. Application Data

(62) Division of application No. 10/461,515, filed on Jun. 16, 2003, now Pat. No. 7,179,774.

(60) Provisional application No. 60/389,718, filed on Jun. 19, 2002.

(51) Int. Cl.
*C11D 7/50* (2006.01)

(52) U.S. Cl. .................. 134/38; 510/201; 510/212; 510/407

(58) Field of Classification Search ............ 510/201, 510/212, 407; 134/38
See application file for complete search history.

(56) References Cited

U.S. PATENT DOCUMENTS

| | | | |
|---|---|---|---|
| 2,710,843 A | 6/1955 | Stebetpm | |
| 2,929,789 A | 3/1960 | Pickett et al. | |
| 2,951,043 A | 8/1960 | Blank | |
| 2,971,919 A | 2/1961 | Goldsmith | |
| 3,048,547 A | 8/1962 | Vosbigian | |
| 3,553,144 A | 1/1971 | Murphy | |
| 3,615,827 A | 10/1971 | Murphy | |
| 3,681,250 A | 8/1972 | Murphy | |
| 3,847,839 A | 11/1974 | Murph et al. | |
| 4,090,001 A | 5/1978 | Mertzweiller nee Maillard et al. | |
| 4,294,617 A | 10/1981 | Schlicklin et al. | |
| 4,537,705 A | 8/1985 | Mahoney et al. | |
| 4,592,787 A * | 6/1986 | Johnson ................ | 134/38 |
| 4,619,706 A | 10/1986 | Squires et al. | |
| 4,673,524 A | 6/1987 | Dean | |
| 4,769,170 A | 9/1988 | Omori et al. | |
| 4,770,713 A | 9/1988 | Ward | |
| 5,006,279 A | 4/1991 | Grobbel et al. | |
| 5,279,760 A | 1/1994 | Sato et al. | |
| 5,391,234 A | 2/1995 | Murphy | |
| 5,411,678 A | 5/1995 | Sim | |
| 5,454,985 A | 10/1995 | Harbin | |
| 5,536,439 A | 7/1996 | Harbin | |
| 5,591,702 A | 1/1997 | Murphy | |
| 5,597,788 A | 1/1997 | Stevens | |
| 5,632,822 A | 5/1997 | Knipe, Jr. et al. | |
| 5,701,922 A | 12/1997 | Knipe, Jr. et al. | |
| 5,721,204 A | 2/1998 | Maxwell et al. | |
| 5,744,437 A | 4/1998 | Rowe et al. | |
| 5,759,975 A | 6/1998 | Maxwell | |
| 5,854,190 A | 12/1998 | Knipe, Jr. et al. | |
| 5,954,891 A | 9/1999 | Kondoh et al. | |
| 5,972,865 A | 10/1999 | Knipe, Jr. et al. | |
| 5,990,062 A | 11/1999 | Summerfield et al. | |
| 6,048,924 A | 4/2000 | Obayashi et al. | |
| 6,071,334 A | 6/2000 | Wider et al. | |
| 6,200,940 B1 | 3/2001 | Vitomir et al. | |
| 6,241,912 B1 | 6/2001 | Kitano et al. | |
| 6,303,552 B1 | 10/2001 | Vitomir et al. | |
| 6,306,374 B1 | 10/2001 | Ramin et al. | |
| 6,511,547 B1 | 1/2003 | Sahbari | |
| 6,881,711 B1 | 4/2005 | Gershun et al. | |
| 6,887,837 B2 * | 5/2005 | Wilson ................ | 510/212 |
| 6,984,616 B2 * | 1/2006 | Fedrigo et al. ........... | 510/407 |
| 7,091,163 B2 * | 8/2006 | Wilson ................ | 510/174 |
| 7,179,774 B2 * | 2/2007 | McKay et al. ........... | 510/201 |
| 7,309,684 B2 * | 12/2007 | Filippini et al. ......... | 510/201 |
| 7,452,852 B2 * | 11/2008 | Wilson ................ | 510/201 |
| 2001/0039251 A1 | 11/2001 | Sachdev et al. | |
| 2002/0144718 A1 * | 10/2002 | Wilson ................ | 134/38 |
| 2003/0138710 A1 | 7/2003 | Park et al. | |
| 2003/0153477 A1 * | 8/2003 | Fedrigo et al. ........... | 510/201 |
| 2004/0002437 A1 | 1/2004 | Wilson | |
| 2004/0009884 A1 * | 1/2004 | McKay et al. ........... | 510/203 |
| 2004/0259753 A1 * | 12/2004 | Wilson et al. ........... | 510/421 |
| 2005/0119143 A1 | 6/2005 | Egbe et al. | |
| 2005/0139238 A1 | 6/2005 | Ferrara | |
| 2005/0187119 A1 * | 8/2005 | Wilson ................ | 510/201 |
| 2006/0089281 A1 * | 4/2006 | Gibson ................ | 510/201 |
| 2006/0258555 A1 * | 11/2006 | Filippini et al. ......... | 510/417 |
| 2007/0117733 A1 * | 5/2007 | McKay et al. ........... | 510/201 |
| 2008/0210265 A1 * | 9/2008 | Crawford et al. ......... | 134/38 |

FOREIGN PATENT DOCUMENTS

| | | |
|---|---|---|
| WO | WO-99/06506 | 2/1999 |
| WO | WO-02/085994 | 10/2002 |

\* cited by examiner

*Primary Examiner*—Gregory E Webb
(74) *Attorney, Agent, or Firm*—Connolly Bove Lodge & Hutz LLP

(57) ABSTRACT

A flushing composition comprising 50% to 95% by weight n-butanol, 0.1% to 3% by weight of a primary amine alkoxylate, and one or more secondary solvents. The flushing composition can also include 0.005% to 0.5% by weight of an aminated organic fatty acid compound formed from the addition of an organic fatty acid. The flushing compositions can be used to remove coatings that adhere to spray coating equipment.

19 Claims, No Drawings

FLUSHING SOLUTIONS FOR COATINGS REMOVAL

CROSS-REFERENCE TO RELATED APPLICATIONS

This application claims priority under 35 U.S.C. §120 and is a divisional application of U.S. patent application Ser. No. 10/461,515, filed on Jun. 16, 2003 now U.S. Pat. No. 7,179,774 (now allowed), which in turn claimed benefit under 35 U.S.C. §119(e) to U.S. Provisional Patent Application No. 60/389,718, filed on Jun. 19, 2002.

FIELD OF THE INVENTION

This invention relates to flushing compositions and flushing solutions used to remove paint and other coatings from surfaces and coating application equipment.

BACKGROUND OF THE INVENTION

Dried water-borne coatings can build up overtime inside the coating supply lines and outside on bell cups or robot caps of coating application equipment. The dried or aged water-based coating cannot be efficiently removed with water alone. If the dried coating is not removed from the application equipment, the potential for it to break free or chip off can cause a coating defect in the finish such as the finish of an automobile.

Current commercial practice utilize flushing solutions that contain amines and an organic solvent selected from lower alcohols and glycol ethers to remove residual coating material from surfaces of coating application equipment. Flushing solutions can be prepared on-site by adding water to flushing concentrates, which are typically marketed to the end user. Generally, the flushing concentrates contain 85% to 99% solvent and 1% to 15% alkanolamine. The flushing concentrates are usually diluted to 5% to 15% by volume, with deionized water. The diluted flushing solutions are then passed through the coating application equipment to remove any unwanted residual coating from surfaces of the equipment.

The alkanolamines that can be used in the solutions include monoethanolamine (MEA), dimethylethanolamine (DMEA), monoisopropanolamine (MIPA), diethanolamine (DEA), and mixtures of primary and secondary alkanolamines. Typical solvents include lower alcohols and glycol ethers such as ethylene glycol n-butyl ether, diethylene glycol n-butyl ether, triethylene glycol methyl ether, propylene glycol n-butyl ether, dipropylene glycol methyl ether, propylene glycol methyl ether, and propylene glycol n-propyl ether. Unfortunately, there is not a single flushing solution that can be used or is ideal for all types of coatings. Different proportions and combinations of alkanolamines and solvents need to be determined for various types of coatings.

One problem that can result in removing a coating from surfaces of coating application equipment is that the flushing solution causes the coating to wrinkle or blister resulting in flakes or chips. These flakes or chips that do no eventually dissolve during the flushing process can remain in the equipment. Subsequent use of the equipment can dislodge the flakes and cause finish imperfections. As a result, it is not only desirable for the flushing solution to remove the coating in a reasonable amount of time, but to also remove the coating by minimizing blistering, and hence formation of flakes. Developing the right flushing composition to remove a specific type of coating, yet minimize flaking is often quite a challenge.

A second problem that arises in commercial settings is the cooling of flushing solutions as they sit or pass through the coating application equipment. Presently, some automotive assembly plants use rotating bell applicators to apply water-based coatings to the vehicle body. The bells spin at 20,000 to 60,000 RPM during the coating process. Shaping air is also blown over the bells to direct the coating to the vehicle. The bell cup and housing unit can also act as a heat sink. The rotation of the bells, shaping air, and the equipment itself all contribute to cooling previously heated flushing solutions to ambient or near ambient temperatures during a cleaning or purge cycle.

Cooled flushing solutions are generally not as effective in removing residual coatings. Due to different manufacturing protocols and differences in coating equipment some commercial manufacturers experience more cooling of the flushing solution than is desired. As a result, there is a need to develop flushing compositions that are effective at removing coatings at or near ambient temperatures.

SUMMARY OF THE INVENTION

The invention is directed to flushing compositions comprising 50% to 95% by weight n-butanol, 0.1% to 3% by weight of a primary amine alkoxylate, and one or more secondary solvents. The flushing composition can also include 0.005% to 0.5% by weight of an aminated organic fatty acid compound formed from the addition of an organic fatty acid.

The flushing compositions can be used to remove coatings that adhere to spray coating equipment. In particular, the flushing compositions have been shown to effectively remove coatings that contain a water-based, nonionic urethane resin dispersion.

DESCRIPTION OF THE INVENTION

Applicants have developed flushing compositions that can be used to remove coatings, particularly water-based coatings that contain a nonionic, urethane resin dispersion. Previous known flushing solutions were commercially unacceptable in removing coatings with a nonionic, urethane resin dispersion, especially, as the flushing solution cooled to or near ambient temperatures. These solutions either required relatively long contact times, or caused blistering and flaking of the coating.

The invention is directed to flushing compositions that are particularly effective at removing coatings containing a water-based nonionic urethane resin dispersion. The flushing compositions of the invention are also effective at removing coatings that include a blend of an anionic, acrylic water-reducible resin and the nonionic urethane resin dispersion.

The invention is directed to a flushing composition comprising 50% to 95% by weight n-butanol, and 0.1% to 3% by weight of a primary amine alkoxylate, and one or more secondary solvents. The secondary solvents are selected from of sec-butyl alcohol, iso-butyl alcohol, n-propyl alcohol, furfuryl alcohol, tetrahydrofurfuryl alcohol, acetone, or aromatic ethoxylates, wherein the stated weight percents do not include the amount of water in the flushing composition. The primary amine alkoxylate used in the flushing composition is of formula $H_2N(CH_2CH_2O)_nH$ or $H_2N(CH_2CH(CH_3)O)_nH$, wherein n is 1 to 10, preferably n is 2 to 4. A mixture of any two primary amine alkoxylates can also be used. Increasing the alkoxylate level, e.g., from n=1 to n=2, of the primary amine alkoxylate can reduce the level of volatile organic compounds (VOCs) in the flushing compositions without appreciably effecting the performance of the flushing solution.

The primary amine alkoxylate exhibits enhanced performance over comparable flushing compositions containing secondary or tertiary alkanolamines such as diisopropanolamine (DIPA) and dimethylethanolamine (DMEA) in the removal of coatings containing a water-based nonionic urethane resin dispersion, or a urethane resin blend containing an anionic, acrylic water-reducible resin.

The amount of primary amine alkoxylate in the flushing composition is directly related to the performance of the flushing solution at removing coatings with a nonionic, urethane resin dispersion from coating application equipment. Flushing compositions containing relatively high amounts of primary amine alkoxylate, i.e., greater than 5% by weight (not including water), and flushing compositions containing relatively medium amounts of primary amine alkoxylate, i.e., from 3% to 5% by weight (not including water), showed little or no performance enhancement as compared to other alkanolamines, including common secondary and tertiary amine alkoxylates at similar concentrations. Also, the performance of the flushing composition decreased as the concentration of the primary amine alkoxylate increased from 3% by weight (not including water).

However, quite unexpectedly, flushing compositions that contain relatively small amounts of primary amine alkoxylate, e.g., from 0.1% to 3% by weight (not including water), exhibit improved performance over other alkanolamines at similar concentrations. Applicants also observed that if the primary amine alkoxylate is absent from the flushing composition, the performance of the flushing solution is relatively poor. Consequently, there is an optimal concentration of the primary amine alkoxylate in the flushing compositions of the invention that is from 0.1% to 3% by weight, from 0.2% to 1.5% by weight, and from 0.4% to 1.2% by weight (not including water).

Another important component to the flushing compositions of the invention is the amount of and type of solvent used in the flushing compositions. The flushing solutions of the invention also contain n-butanol. The amount of n-butanol in the flushing composition is from 50% to 95% by weight (not including water). In the preferred embodiment, the amount of n-butanol in the flushing composition is from 65% to 90% by weight (not including water).

n-Butanol has a solubility in water of about 7.7% by weight. As a result, phase separation of n-butanol from prepared flushing solutions can occur if the n-butanol concentration exceeds about 7% to about 8% by weight of the flushing solution. Phase separation of the flushing solution during use can lead too less efficient removal of coating from the coating application equipment.

To minimize phase separation, fatty acids with ten or more carbon atoms can be added to the flushing compositions of the invention. It is believed the addition of an organic fatty acid to the flushing solution results in the formation of an aminated fatty acid compound. The organic fatty acid will have at least ten, preferably at least twelve carbons, and can be added as the free-acid or its corresponding salt. The fatty acid is believed to react with the primary amine ethoxylate or with another amine present in the flushing composition to form the aminated fatty acid compound. The organic fatty acids or the salts thereof, used in the flushing compoisitions will have from 10 to 24 carbon atoms, preferably from 12 to 20 carbon atoms, more preferably from 14 to 20 carbon atoms. The fatty acids can be fully saturated or polyunsaturated.

The preferred fatty acids used in the flushing compositions are selected from palmitic acid, oleic acid, stearic acid. The corresponding salts of these fatty acids can also be used, including the alkali metal salts, particularly sodium salts. The weight percent of fatty acid added to the flushing solution compositions is from 0.005% to 0.5% by weight, preferably from 0.005% to 0.1% by weight, not including the amount of water.

The flushing solution composition also contains one or more secondary solvents selected from sec-butyl alcohol, iso-butyl alcohol, n-propyl alcohol, furfuryl alcohol, tetrahydrofurfuryl alcohol, acetone, or aromatic ethoxylates. The preferred secondary solvents are n-propyl alcohol, iso-butyl alcohol, furfuryl alcohol, and the aromatic ethoxylates. The amount of secondary solvent in the flushing compositions is from 5% to 35% by weight, preferably from 10% to 30% by weight, not including the amount of water present.

In one embodiment, the flushing composition of the invention includes; 65% to 90% by weight, preferably 75% to 90% by weight, n-butanol, 5% to 20% by weight of an alcohol selected from n-propyl alcohol, iso-propyl alcohol, furfuryl alcohol, or mixtures thereof, and 0.4% to 1.2% by weight, of a primary amine alkoxylate selected from monoethanolamine, digylcol amine, or mixtures thereof, wherein the stated weight percents do not include the amount of water in the flushing composition. The flushing composition can also include 5% to 15% of an aromatic ethoxylate solvent, and/or an animated fatty acid compound, which is formed by the addition of 0.005% to 0.5%, preferably 0.005% to 0.1% by weight, of an organic fatty acid.

The flushing solution composition can also contain one or more solvents selected from glycols or glycol ethers. Examples of some glycol ethers that can be used include ethylene glycol n-butyl ether, diethylene glycol n-butyl ether, triethylene glycol methyl ether, propylene glycol n-butyl ether, dipropylene glycol methyl ether, propylene glycol methyl ether, and propylene glycol n-propyl ether.

In some cases, it is advantageous to have a buffering agent as part of the flushing composition. The buffering agent can be any chemical buffering agent or system that provides and helps maintain a pH of the flushing solution that is lower than the pH of an essentially identical flushing solution, but without the buffering agent. The buffering agent can be a buffering organic acid or a salt thereof, or an inorganic acid. If the buffering agent utilized is an inorganic acid, the use of a diprotic or triprotic acid is preferred. Inorganic acids that can be used include phosphoric acid and boric acid. The list of buffering organic acids that can be used include, but are not limited to, gluconic acid, malic acid, glycolic acid, and citric acid. The flushing solutions can also include additives, e.g., one or more chelators, surfactants, known corrosion inhibitors, and/or co-solvents.

The flushing compositions can also include water. In fact, the flushing compositions that are produced and marketed to an end-user are usually in the form of a concentrated aqueous flushing composition. The end-user then dilutes the flushing composition with water, preferably deionized water, to form an effective flushing solution for a given task.

The addition of water to the flushing solutions of the invention can facilitate the formulation of the flushing composition at the production facility. As a result, although the flushing solutions of the invention can be prepared and marketed without or with minimal amounts of water, it is often preferred to add water to the flushing compositions during production. The amount of water in the flushing compositions can range from 1% to 95% by volume. However, because of the economic cost of shipping and storing the concentrates, it is preferred that the flushing solution compositions contain no more than 60% by volume water, preferably from 10% to 50% by volume water.

The ethoxylate solvent contains one or more compounds with an aromatic ring, e.g., a phenyl ring, substituted on at least one position with an aliphatic group containing two or more ethoxylate units. The end ethoxylate unit can be end-capped with a hydrogen, $C_1$-$C_6$ alkyl or phenyl. The aromatic ring can also contain one or more alkyl substituents with one to four carbons. Examples of some alkyl substituents include methyl, ethyl, propyl, and isopropyl.

In one embodiment, the ethoxylate solvent composition contains one or more compounds with an aromatic ring and ethoxylate units of general formula I

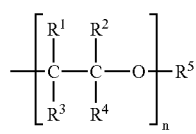

I wherein: $R^1$, $R^2$, $R^3$ and $R^4$ are independently selected from hydrogen and methyl; $R^5$ is hydrogen, a $C_1$-$C_6$ alkyl, or phenyl; and n is 2, 3, 4, 5 or 6. The ethoxylate unit of formula I is attached to the aromatic ring directly or through an ether (oxygen) linkage or an oxymethylene (—$CHR^8O$—) linkage, wherein $R^8$ is hydrogen or $C_1$-$C_4$ alkyl.

One type of an ethoxylate solvent composition contains one or more ethoxylated compounds of general formula II with a number average (Navg.) of ethoxylate units from about 3 to about 8, wherein $R^1$, $R^2$, $R^3$, $R^4$ and $R^5$ are as defined in formula I, and $R^6$, $R^7$ and $R^8$ are independently selected from hydrogen and $C_1$-$C_4$ alkyl. Preferably, the substituents $R^1$, $R^2$, $R^3$ and $R^4$ combine to be at least 60 atom %, more preferably at least 80 atom %, hydrogen. Also, it is preferred that if Navg. is less than four, then $R^5$ is hydrogen.

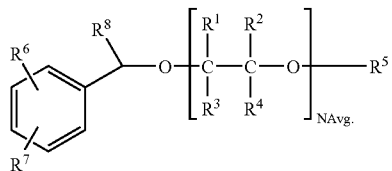

Still another type of an ethoxylate solvent composition contains one or more ethoxylated compounds of general formula III with a number average (Navg.) of ethoxylate units from about 3 to about 8, wherein $R^1$, $R^2$, $R^3$, $R^4$ and $R^5$ are as defined in formula I, and $R^6$ and $R^7$ are independently selected from hydrogen and $C_1$-$C_4$ alkyl. Preferably, the substituents $R^1$, $R^2$, $R^3$ and $R^4$ combine to be at least 60%, more preferably at least 80%, hydrogen atoms. Also, it is preferred that if Navg. is less than four, then $R^5$ is hydrogen. Also, it is preferred that if Navg. is less than four, then $R^5$ is hydrogen.

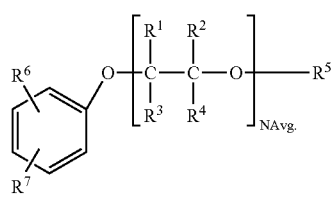

III

One type of solvent composition that can be used is the Genapol® family of solvent compositions obtained from Clariant. For example, Genapol® BA 04 is a mixture of ethoxylated benzyl alcohols of general formula II that contain from one to about 10 ethoxylate units. A small weight percentage of the solvent composition can also contain compounds with more than 10 ethoxyylate units. The manufacturer reports that Genapol® BA 04 has a number average (Navg.) of ethoxylate units of about 3.8.

It is to be understood that flushing compositions of the invention are not limited to the type of commercially available ethoxylated aromatic solvents noted above. These types of solvent compositions are provided only as examples of ethoxylated solvent compositions that can be used in the flushing solution compositions of the invention. Applicants emphasize that if an aromatic ethoxylated solvent is used in the flushing solution composition of the invention, the aromatic ethoxylated solvent is of the general class of compounds defined with an ethoxylate group of formula I attached to an aromatic organic moiety.

High or low foaming surfactants can be added to the flushing compositions. Also, surfactants with relatively low or high critical micelle temperatures can be used. The surfactant is at times needed to improve initial wetting of the paint or coating to be removed. Also, if deionized water is not used to dilute the flushing compositions, and instead, relatively hard water is used, a surfactant can minimize the build-up of solids that adhere to the surfaces of the application equipment.

The surfactant may be anionic, non-ionic, cationic or amphoteric in character, but preferably is a low foaming surfactant or is used in combination with a defoamer to minimize the amount of foam generated during use. Examples of suitable surfactants include alkylaryl sulfonates such as sodium xylene sulfonate, ethoxylated fatty esters and oils such as MERPOL A (available commercially from E.I. duPont de Nemours & Co.), non-ionic fluorocarbon-based surfactants such as ZONYL FSN (available from E.I. duPont de Nemours & Co.), and non-ionic ethoxylated alkylphenols such as ethoxylated octylphenol.

If the water used is very "hard", meaning that it contains substantial concentrations of calcium and/or magnesium cations, a chelating agent for these ions may be needed to minimize unwanted formation of scums on the surfaces being cleaned. Suitable chelating agents include water-soluble compounds containing two or more functional groups such as carboxylic acid groups, phosphoryl groups, amine groups, and/or hydroxyl groups which are arranged in suitable positions in the chelating agent molecule such that atoms in two or more functional groups are capable of complexing with a single calcium and/or magnesium cation. Non-limiting examples of suitable chelating agents include EDTA, gluconic acid, citric acid, polyphosphonic acids, and salts thereof.

Corrosion inhibitors known in the art can be present in the flushing compositions of the invention. Suitable corrosion inhibitors include, but are not limited to, benzotriazoles such as 2-mercaptobenzothiazole, toluoltriazole, benzotriazole, 2(3H)-benzothiazolethione, and borates.

The invention is also directed to methods of using the flushing compositions to remove residual coatings that contain a water-based, nonionic, urethane resin dispersion coatings from surfaces of coating application equipment. The method of the invention includes; providing a flushing composition comprising n-butanol and a primary amine alkoxylate, diluting the flushing composition with water to form a diluted flushing solution, and passing the diluted flushing solution through the coating application equipment to remove the coating from the surfaces of the coating application equipment. The method of the invention can also be used to remove coatings that contain an anionic acrylic water reducible resin, wherein the coating contains less acrylic resin than urethane resin by weight.

Diluted flushing solutions prepared from the flushing compositions of the invention are used to remove residual coating from coating application equipment. Removal of the residual coating is required, for example, when the user switches from one color to another, or following use of the equipment. To prepare a diluted flushing solution, the end-user dilutes a flushing composition from 2% to 50% by volume with water, preferably deionized water. In other embodiments, the flushing composition is diluted from 2% to 30% by volume, preferably from 5% to 20% by volume, by the addition of water. Of course, the degree of dilution will depend upon the initial concentration of the flushing compositions.

Coatings can be removed from a variety of surfaces, e.g., steel, aluminum, or glass, by contacting the surface with a flushing solution of the invention. Although the methods of contacting the surface with the flushing solution can be accomplished in a number of ways, immersion and spraying are the most preferred methods. If the surface to be cleaned is readily accessible, then spraying is generally preferred. The mechanical force of the impinging flushing solution facilitates removal of the paint. On the other hand, if the surface to be cleaned has recesses or other shapes that are not readily accessible, immersion will generally be preferred. Of course, both methods can be used in combination and/or varied in ways apparent to those skilled in the art. Optimal dilution ratios and temperature of the flushing solution depends on the method of contact.

Flushing solutions prepared from flushing compositions of the invention are also useful for removing paint residues from automated and manual equipment such as paint sprayers and paint dip installations. Typically, the flushing solution is introduced into a purge tank containing an amount of deionized water effective to dilute the flushing solution to about 5% to about 15% by volume. The resulting diluted flushing solution is heated to a temperature of from about 30° C. to about 60° C. and then circulated through the equipment to remove any residual paint from the equipment. However, in practice, the temperature of the circulating flushing solution is often lower than the temperature of the flushing solution in the purge tank due to the consequent heat loss during circulation. Prior to and/or after circulation of the diluted flushing solution, the equipment may be subjected to other cleaning methods such as flushing with water or with a gas such as air or nitrogen. To minimize waste, used diluted flushing solution can be reconditioned (by removing paint solids by means such as filtration, settlement, coagulation or the like) and recirculation through the equipment.

The contact time needed to effect a substantial removal of paint from a surface will depend on the nature and thickness of the paint, the composition of the flushing solution including the dilution factor, the temperature of the solution, and other factors. With some paints and under some conditions, contact times of a few minutes (e.g., 2-3 minutes) may be sufficient. In some instances, the contact times can be 1 hour or more.

If the flushing solutions are sprayed onto a surface, the praying pressure will usually range from 1.3 bars to 8.0 bars absolute pressure. The temperature of the flushing solution will usually range from 15° C. to 60° C. Higher temperatures and pressures generally increase the rate at which the paint is removed from the surface.

The invention and its benefits will be better understood with reference to the following examples. These examples are intended to illustrate specific embodiments within the overall scope of the invention as claimed, and are not to be understood as limiting the invention in any way.

Dwell Time Method

Provided below is a test method that is used to evaluate flushing solutions prepared from flushing compositions of the invention. The prepared flushing solutions are used to remove semi-dry coatings that contain nonionic, urethane resin dispersion at ambient solution and panel temperatures.

Glass panel were coated with 1.0 mil of BASF E54WW301 WA800J White Diamond Ground Coat, Product ID: NLO C20898. The coated glass panels were baked at 120 F for 5 minutes to dehydrate the film. Test line flushing solutions were prepared by diluting the flushing compositions of the invention as well as the flushing compositions used as comparative examples to 10% by volume with distilled water. Using a disposable Bico ink pen, a star with a diameter of roughly 1 cm was lightly drawn on the surface of the paint film. Two to five drops of the test line flushing solution was applied on top of the star. Using a stopwatch, the contact time required to distort or remove the drawn star was recorded in seconds. Less seconds to distort or remove the star can suggest a relatively greater performance for the line flushing solution. However, peeling or wrinkling of the paint film is not a desirable performance because the loosened chips can effect finish in subsequent coating applications. Optimal performance is characterized by short dissipation of the star and little or no peeling or wrinkling of the dried coating.

EXAMPLES 1 AND 2 AND COMPARATIVE EXAMPLE 1

Compositions of examples 1 and 2, and comparative example 1, are recited in Table 1. Comparative example 1 does not contain n-butanol. Test results are also shown in Table 1.

TABLE 1

| Ex. | BA 04 % | MEA % | MIPA % | n-butanol % | acetone % | water % | Avg, removal (sec) | Observations |
|---|---|---|---|---|---|---|---|---|
| 1 | 27 | 1.0 | 2.0 | 60 | 10 | — | 22.3 | dissolved |
| 2 | 27 | 1.0 | 2.0 | 70 | — | — | 34.2 | dissolved |
| Comp. 1 | 27 | 3.0 | — | — | — | 70 | 300 | intact |

EXAMPLES 3-5

Examples 3-5 contain different amounts of diglycol amine and Genepol® BA 04 with 70% by weight n-butanol. The compositions and test results are provided in Table 2.

TABLE 2

| Ex. | BA 04 % | DGA % | n-butanol % | Avg, removal (sec) | Observations |
|---|---|---|---|---|---|
| 3 | 29 | 1 | 70 | 10.0 | dissolved |
| 4 | 27 | 3 | 70 | 15.1 | dissolved |
| 5 | 24 | 6 | 70 | 15.2 | dissolved |

EXAMPLE 3 AND 6-8

Examples 3 and 6-8 contain different amounts of n-butanol and secondary solvent. The compositions and test results are provided in Table 3.

TABLE 3

| Ex. | BA 04 % | DGA % | n-butanol % | water % | Avg, removal (sec) | Observations |
|---|---|---|---|---|---|---|
| 3 | 29 | 1 | 70 | — | 14.5 | dissolved |
| 6 | 5 | 1 | 70 | 24 | 41.1 | dissolved |
| 7 | 10 | 1 | 70 | 19 | 26.3 | dissolved |
| 8 | 40 | 1 | 59 | — | 30.4 | dissolved |

COMPARATIVE EXAMPLES 2 AND 3

Comparative examples 2 and 3 do not contain n-butanol. The compositions are recited in Table 4.

TABLE 4

| Ex. | BC EB % | MEA % | MIPA % | PnP % | Avg, removal (sec) | Observations |
|---|---|---|---|---|---|---|
| Comp. 2 | 98 | — | 2 | — | 21.8 | dissolved |
| Comp. 3 | — | 3 | — | 97 | 300 | Paint cracked around star; star intact |

BC EB is Butyl Cello Solve EB
PnP is propylene glycol n-propyl ether

EXAMPLES 9-11 AND COMPARATIVE EXAMPLE 4 AND 5

Examples 9-11 contain 3% by weight of the recited primary alkoxylate amine, 50% by weight n-butanol, and 47% by weight propylene glycol n-propyl ether (PnP). Comparative example 4 contains 3% by weight of the recited tertiary alkanolamine, and comparative example 5 contains 3% by weight of the recited secondary alkanolamine. Test results are shown in Table 5.

TABLE 5

| Ex. | Amine 3% | Avg, removal (sec) | Observations |
|---|---|---|---|
| 9 | MEA | 40 | wrinkled paint causing chipping of large pieces |
| 10 | MIPA | 40 | wrinkled paint causing chipping of large pieces |
| 11 | DGA | 40 | wrinkled paint causing chipping of large pieces |
| Comp. 4 | DMEA | 40 | wrinkled paint causing chipping of large pieces |
| Comp. 5 | DIPA | 40 | wrinkled paint causing chipping of large pieces |

EXAMPLES 12-15

Examples 12-15 contain 3% by weight of diglycol amine, 70% by weight n-butanol, 10% of Genepol® BA 04, and 17% by weight of the recited secondary solvent. iso-butyl alcohol and n-propyl alcohol exhibit enhanced performance other secondary solvents (alcohols). Test results are shown in Table 6.

TABLE 6

| Ex. | alcohol | Avg, removal (sec) |
|---|---|---|
| 12 | ethanol | 26.2 |
| 13 | iso-butyl | 13.2 |
| 14 | n-propyl | 13.2 |
| 15 | iso-propyl | 20 |

EXAMPLES 16 AND 17 AND COMPARATIVE EXAMPLE 6

Examples 16 and 17 contain 70% by weight n-butanol, 17% by weight of iso-butyl alcohol, 10% by weight Genepol® BA 04, and 3% by weight of the recited primary amine alkoxylate. Comparative example 6 contains 70% by weight n-butanol, 17% by weight of iso-butyl alcohol, 10% by weight Genepol® BA 04, and 3% by weight of dimethylethanolamine. Test results are shown in Table 7.

TABLE 7

| Ex. | amine | Avg, removal (sec) |
|---|---|---|
| 16 | MEA | 5.6 |
| 17 | DGA | 6.6 |
| Comp. 6 | DMEA | 7.5 |

EXAMPLES 20-22 AND COMPARATIVE EXAMPLE 7

Examples 20-22 contain 70% by weight n-butanol, 27% by weight of distilled water, and 3% by weight of the recited alkanolamine. Comparative example 7 contains 70% by weight n-butanol, 27% by weight of distilled water, and 3% by weight of dimethylethanolamine. Test results are shown in table 7.

TABLE 7

| Ex. | amine | Avg, removal (sec) |
|---|---|---|
| 18 | MIPA | 19.2 |
| 19 | DGA | 22.7 |
| 20 | MEA | 16.8 |
| Comp. 7 | DMEA | 31.6 |

EXAMPLES 21 AND 22, AND COMPARATIVE EXAMAPLES 8-10

Examples 21 and 22 contain 70% by weight of the recited alcohol, 27% by weight Genepol® BA 04, and 3% by weight of diglycol amine. The test results are shown in Table 8.

TABLE 8

| Ex. | alcohol | Avg, removal (sec) | Observations on star |
|---|---|---|---|
| 21 | i-butanol | 27.9 | dissolved |
| 22 | n-butanol | 15.1 | dissolved |
| Comp. 8 | i-propyl | 300 | no effect |
| Comp. 9 | n-propyl | 300 | cracked paint moderately; star intact |
| Comp. 10 | ethanol | 300 | cracked paint slightly; star intact |

COMPARATIVE EXAMPLES 11 AND 12

Comparative examples 11 and 12 contain 70% by weight of propylene glycol n-propyl ether (PnP), 27% by weight Genepolo BA 04, and 3% by weight of the recited primary amine alkoxylate. Test results are shown in Table 9.

TABLE 9

| Ex. | amine | Avg, removal (sec) | Observations |
|---|---|---|---|
| Comp. 11 | MEA | 300 | paint cracked around star; star intact |
| Comp. 12 | MIPA | 300 | paint cracked around star; star intact |

EXAMPLES 23-24 AND COMPARATIVE EXAMPLES 13 AND 14

Examples 23-24 contain 27% by weight Genepol® BA 04, 70% by weight n-butanol, and the recited primary amine alkoxylate(s). Comparative examples 13 and 14 contain 27% by weight Genepol® BA 04, 70% by weight PnP, and the recited primary amine alkoxylate. Test results are shown in Table 10.

TABLE 10

| Ex. | DGA % | MEA % | MIPA % | Avg, removal (sec) | Observations |
|---|---|---|---|---|---|
| 23 | — | 1 | 2 | 34.2 | dissolved |
| 24 | 3 | — | — | 15.1 | dissolved |
| Comp. 13 | — | 3 | — | 300 | paint cracked around star; star is deformed |
| Comp. 14 | — | — | 3 | 300 | paint cracked around star; star is deformed |

EXAMPLES 25-27 AND COMPARATIVE EXAMPLES 15

Examples 25-27 contain 29% by weight iso-butyl alcohol, 70% by weight n-butanol, and 1% by weight the recited primary amine alkoxylate. Comparative example 15 contains 29% by weight iso-butyl alcohol, 70% by weight n-butanol, and 1% by weight of DMEA. Test results are shown in Table 11.

TABLE 11

| Ex. | DGA % | MEA % | MIPA % | DMEA % | Avg, removal (sec) |
|---|---|---|---|---|---|
| 25 | 1 | — | — | — | 9.0 |
| 26 | — | 1 | — | — | 7.4 |
| 27 | — | — | 1 | — | 9.9 |
| Comp. 15 | — | — | — | 1 | 10.6 |

EXAMPLES 27-29 AND COMPARATIVE EXAMPLES 16-18

Examples 27-29 contain 70% by weight n-butanol, the recited amount of iso-butyl alcohol, and the recited amount of primary amine alkoxylate. Comparative examples 16-18 contain 70% by weight n-butanol, the recited amount of iso-butyl alcohol, and the recited amount weight of DMEA. Test results are shown in Table 12.

TABLE 12

| Ex. | MEA % | iso-butyl alcohol % | DMEA % | Avg, removal (sec) |
|---|---|---|---|---|
| 26 | 1 | 29 | — | 10.0 |
| 28 | 3 | 27 | — | 10.7 |
| 29 | 6 | 24 | — | 13.3 |
| Comp. 16 | — | 29 | 1 | 13.6 |
| Comp. 17 | — | 27 | 3 | 11.7 |
| Comp. 18 | — | 24 | 6 | 12.4 |

EXAMPLES 30 AND 31

Examples 30 and 31 contain 70% by weight n-butanol, 27% by weight Genepol® BA 04, and the recited amount of primary amine alkoxylate. Test results are shown in Table 13.

TABLE 13

| Ex. | DGA % | MEA % | MIPA % | Avg, removal (sec) |
|---|---|---|---|---|
| 30 | 3 | — | — | 10.7 |
| 31 | — | 1 | 2 | 17.4 |

EXAMPLES 16 AND 32-36

Examples 16 and 32-36 contain 70% by weight n-butanol, 10% by weight Genepol® BA 04, and the recited amount of the primary amine alkoxylate, monoethanolamine. Test results are shown in Table 14.

TABLE 14

| Example | MEA % | iso-butyl alcohol % | Avg. Removal (sec) |
|---|---|---|---|
| 16 | 3.0 | 17 | 7.1 |
| 32 | 1.5 | 18.5 | 7.1 |
| 33 | 1.0 | 19 | 5.9 |
| 34 | 0.5 | 19.5 | 6.0 |
| 35 | 0.25 | 19.75 | 7.5 |
| 36 | 0 | 20 | 13.4 |

EXAMPLES 37 AND 38

Examples 37 and 38 contain small amounts of an aminated oleic acid compound, which is believed to form upon the addition of oleic acid. The flushing solutions are preparing from mixing 0.9% by weight of MEA and 0.02% by weight oleic acid to the other components recited in Table 15.

TABLE 15

| Example | n-butanol % | n-propyl alcohol % | Genepol BA-04 % |
|---|---|---|---|
| 37 | 85 | 14.08 | — |
| 38 | 79.08 | 10 | 10 |

EXAMPLE 39

Example 39, like Examples 37 and 38, contains a small amount of an aminated oleic acid compound, which is believed to form upon the addition of a small amount of oleic acid. The flushing solutions are prepared from mixing 79.09% n-butanol, 10% n-propyl alcohol, 10% Genepol BA-04, 0.9% by weight of MEA and 0.01% by weight oleic acid.

We claim:

1. A method of removing a coating from surfaces of coating application equipment comprising:
    providing a flushing composition comprising 50% to 95% by weight n-butanol, 0.1% to 3% by weight of a primary amine alkoxylate, and one or more secondary solvents, wherein the stated weight percents do not include the amount of water in the flushing composition;
    diluting the flushing composition with water to form a diluted flushing solution with 70% to 98% by volume water; and
    passing the diluted flushing solution through the coating application equipment to remove the coating from the surfaces of the coating application equipment, wherein the coating comprises a water-based, nonionic urethane resin dispersion.

2. The method of claim 1 wherein the diluted flushing solution passing through the coating application equipment is at a temperature from 60° F. to 90° F.

3. The method of claim 1 wherein the coating further comprises an anionic acrylic water reducible resin, and the coating contains less acrylic resin than urethane resin by weight.

4. The method of claim 3 wherein the coating comprises 90% by weight or more of the urethane resin and 0.5% to 10% by weight of the acrylic resin.

5. The method of claim 1 wherein the weight percent of n-butanol is from 65% to 90% and the weight percent of primary amine alkoxylate is from 0.2% to 1.5%.

6. The method of claim 1 wherein the flushing composition further comprises an animated fatty acid compound formed by the addition of 0.005% to 0.5% by weight of an organic fatty acid.

7. The method of claim 1 wherein the secondary solvent is selected from the group consisting of sec-butyl alcohol, iso-butyl alcohol, n-propyl alcohol, furfuryl alcohol, tetrahydrofururyl alcohol, acetone, and aromatic ethoxylate.

8. The method of claim 1 wherein the secondary solvent is selected from aromatic ethoxylate, n-propyl alcohol, or furfuryl alcohol, and is present from 10% to 30% by weight, wherein the stated weight percent does not include the amount of water in the flushing composition.

9. The method of claim 8 wherein the primary amine alkoxylate is from 0.2% to 1.5% by weight.

10. The method of claim 1, wherein the primary amine alkoxylate is of the formula $H_2N(CH_2CH_2O)_nH$, and wherein n is 1 to 10.

11. The method of claim 1, wherein the primary amine alkoxylate is of the formula $H_2N(CH_2CH(CH_3)O)_nH$, and wherein n is 1 to 10.

12. The method of claim 1, wherein the one or more secondary solvents are selected from aromatic ethoxylates, n-propyl alcohol or furfuryl alcohol.

13. The method of claim 1, wherein the primary amine alkoxylate is of the formula $H_2N(CH_2CH_2O)_nH$, wherein n is 1 to 10, and wherein the one or more secondary solvents are selected from aromatic ethoxylates, and propyl alcohol or furfuryl alcohol.

14. The method of claim 1, wherein the primary amine alkoxylate is of the formula $H_2N(CH_2CH(CH_3)O)_nH$, wherein n is 1 to 10, and wherein the one or more secondary solvents are selected from aromatic ethoxylates, and propyl alcohol or furfuryl alcohol.

15. The method of claim 1, wherein the one or more secondary solvents comprises aromatic ethoxylates of general formula II with a number average (Navg.) of ethoxylate units from about 3 to about 8,

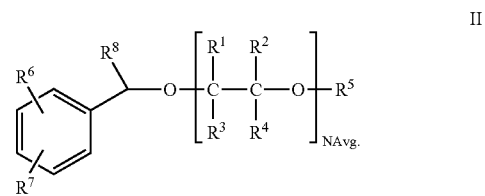

wherein $R^1$, $R^2$, $R^3$ and $R^4$ are independently selected from hydrogen and methyl, $R^5$ is hydrogen, a $C_1$-$C_6$ alkyl, or phenyl, and $R^6$, $R^7$ and $R^8$ are independently selected from hydrogen and $C_1$-$C_4$ alkyl.

16. The method of claim 1, wherein the flushing composition comprises:
    65% to 90% by weight n-butanol;
    10% to 30% of one or more alcohols selected from the group consisting of n-propyl alcohol, iso-propyl alcohol, and furfuryl alcohol; and
    0.4% to 1.2% by weight of primary amine alkoxylates selected from the group consisting of monoethanolamine, diglycol amine, and mixtures thereof; wherein the stated weight percents do not include the amount of water in the flushing composition.

17. The method of claim 16, wherein the flushing composition further comprises 5% to 15% of an aromatic ethoxylate solvent.

18. The method of claim 16, wherein the flushing composition further comprises an aminated fatty acid compound formed by the addition of 0.005% to 0.5% by weight of an organic fatty acid.

19. The method of claim 17, wherein the aromatic ethoxylate solvent is of general formula II with a number average (Navg.) of ethoxylate units from about 3 to about 8,

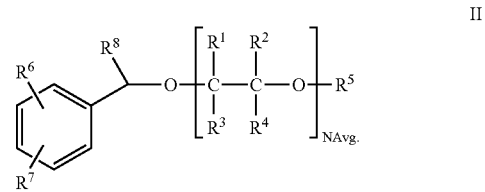

wherein $R^1$, $R^2$, $R^3$ and $R^4$ are independently selected from hydrogen and methyl, $R^5$ is hydrogen, a $C_1$-$C_6$ alkyl, or phenyl, and $R^6$, $R^7$ and $R^8$ are independently selected from hydrogen and $C_1$-$C_4$ alkyl.

* * * * *